United States Patent
Kawahara et al.

(10) Patent No.: US 7,290,216 B1
(45) Date of Patent: Oct. 30, 2007

(54) METHOD AND APPARATUS FOR IMPLEMENTING A SCENE-GRAPH-AWARE USER INTERFACE MANAGER

(75) Inventors: Hideya Kawahara, Mountain View, CA (US); Deron D. Johnson, Newark, CA (US); Daniel J. Petersen, Morgan Hill, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 743 days.

(21) Appl. No.: 10/764,065

(22) Filed: Jan. 22, 2004

(51) Int. Cl.
*G06F 3/00* (2006.01)
*G06F 3/048* (2006.01)

(52) U.S. Cl. ........................ 715/762; 715/763
(58) Field of Classification Search ......... 715/762–763
See application file for complete search history.

(56) References Cited

U.S. PATENT DOCUMENTS

| | | | |
|---|---|---|---|
| 5,107,746 A | 4/1992 | Bauer | 84/626 |
| 5,812,688 A | 9/1998 | Gibson | 381/119 |
| 6,009,394 A | 12/1999 | Bargar et al. | 704/258 |
| 6,154,215 A * | 11/2000 | Hopcroft et al. | 345/418 |
| 6,154,553 A | 11/2000 | Taylor | 381/332 |
| 6,266,053 B1 * | 7/2001 | French et al. | 715/500.1 |
| 6,490,359 B1 | 12/2002 | Gibson | 381/119 |
| 6,741,242 B1 * | 5/2004 | Itoh et al. | 345/419 |
| 7,088,374 B2 * | 8/2006 | David et al. | 345/619 |
| 2003/0011637 A1 * | 1/2003 | Boudier | 345/771 |
| 2004/0090467 A1 | 5/2004 | Bonura et al. | 345/790 |
| 2004/0189668 A1 * | 9/2004 | Beda et al. | 345/619 |
| 2004/0189669 A1 * | 9/2004 | David et al. | 345/619 |
| 2004/0240686 A1 | 12/2004 | Gibson | 381/119 |
| 2004/0252119 A1 * | 12/2004 | Hunleth et al. | 345/440 |
| 2005/0039176 A1 * | 2/2005 | Fournie | 717/156 |
| 2005/0057497 A1 * | 3/2005 | Kawahara | 345/157 |
| 2005/0102636 A1 * | 5/2005 | McKeon et al. | 715/854 |
| 2005/0204306 A1 * | 9/2005 | Kawahara et al. | 715/782 |
| 2006/0122819 A1 * | 6/2006 | Carmel et al. | 703/21 |
| 2007/0035543 A1 * | 2/2007 | David et al. | 345/420 |

FOREIGN PATENT DOCUMENTS

WO    WO 99/13455    3/1999

OTHER PUBLICATIONS

Martin Naef, Edouard Lamboray, Oliver Staadt, Markus Gross□□The Eurographics Association□□2003.*

* cited by examiner

*Primary Examiner*—William Bashore
*Assistant Examiner*—Andrea Long
(74) *Attorney, Agent, or Firm*—Park, Vaughan & Fleming LLP

(57) ABSTRACT

One embodiment of the present invention provides a system that enables a user interface manager to modify a scene graph for an application. During operation, the system receives the scene graph for the application, wherein the scene graph defines visual attributes for a user interface associated with application. Next, the system uses the scene graph to render a visual output for the user interface, and displays the visual output to a user of the application. The system also enables the user interface manager to modify the scene graph, whereby the user interface manager can produce visual effects for the user interface in addition to visual effects produced by the application.

26 Claims, 4 Drawing Sheets

SCENE GRAPH 300

METHOD AND APPARATUS FOR IMPLEMENTING A SCENE-GRAPH-AWARE USER INTERFACE MANAGER

BACKGROUND

1. Field of the Invention

The present invention relates to user interfaces for computer systems. More specifically, the present invention relates to a method and an apparatus for implementing a user interface manager that operates on a scene graph, which defines visual attributes for a user interface associated with an application.

2. Related Art

Today, most personal computers and other high-end devices support window-based graphical user interfaces (GUIs), which were originally developed back in the 1980's. These window-based interfaces allow a user to manipulate windows through a pointing device (such as a mouse), in much the same way that pages can be manipulated on a desktop. However, because of limitations on graphical processing power at the time windows were being developed, many of the design decisions for windows were made with computational efficiency in mind. In particular, window-based systems provide a very flat (two-dimensional) 2D user experience, and windows are typically manipulated using operations that keep modifications of display pixels to a minimum. Even today's desktop environments like Microsoft Windows (distributed by the Microsoft Corporation of Redmond, Wash.) include vestiges of design decisions made back then.

In recent years, because of increasing computational requirements of 3D applications, especially 3D games, the graphical processing power of personal computers and other high-end devices has increased dramatically. For example, a middle range PC graphics card, the "GeForce2 GTS" distributed by the NVIDIA Corporation of Sunnyvale, Calif., provides a 3D rendering speed of 25 million polygon-per-second, and Microsoft's "Xbox" game console provides 125 million polygon-per-second. These numbers are significantly better than those of high-end graphics workstation in the early 1990's, which cost tens of thousands (and even hundreds of thousands) of dollars.

As graphical processing power has increased in recent years, a number of 3D user interfaces have been developed. These 3D interfaces typically allow a user to navigate through and manipulate 3D objects. These 3D user interfaces often represent their constituent 3D objects and the relationships between these 3D objects using a "scene graph." A scene graph includes nodes and links that describe graphical components and relationships between them. For example, graphical components include graphical objects, such as boxes and images, or user interface components, such as buttons and check boxes. (Note that although this specification describes a scene graph that represents 3D graphical components in a 3D display, a scene graph can also be used to represent 2D graphical components in a 2D display.)

A scene graph defines properties for these graphical components, including color, transparency, location, and transformations, such as rotation and scaling. Note that these properties can be expressed in a special kind of node, or alternatively, can be embedded in a graphical node. A scene graph can also define groupings of graphical objects and spatial relationships between graphical objects.

A number of different representations can be used to specify scene graphs. For example, a scene graph can be specified using the Java3D scene graph standard, the Virtual Reality Modeling Language (VRML) standard, or the SVG (Scalable Vector Graphics) standard. A scene graph can also be specified using the extensible Markup Language (XML) format; it is even possible to express a simple scene graph using a HyperText Markup Language (HTML) document.

Graphical display systems typically operate through a window manager, which manages interactions between the user and client applications. In doing so, the window manager accepts user inputs, and translates them into corresponding actions for the client applications. The window manager can then cause the corresponding actions to be performed, possibly based on predefined policies. A window manager can also accept requests from client applications, for example to perform actions on visual or audio representations, and can then perform corresponding actions based on some policies.

Unfortunately, in existing systems, clients do not expose the graphical components they are supporting to the window manager. Consequently, the window manager has only limited capabilities to view and manipulate graphical components defined by client applications.

Hence, what is needed a method and an apparatus that more effectively enables a window manager to view and manipulate graphical components defined by client applications.

SUMMARY

One embodiment of the present invention provides a system that enables a user interface manager to modify a scene graph for an application. During operation, the system receives the scene graph for the application, wherein the scene graph defines visual attributes for a user interface associated with application. Next, the system uses the scene graph to render a visual output for the user interface, and displays the visual output to a user of the application. The system also enables the user interface manager to modify the scene graph, whereby the user interface manager can produce visual effects for the user interface in addition to visual effects produced by the application.

In a variation on this embodiment, receiving the scene graph for the application involves: allowing the application to construct the scene graph; and then receiving the scene graph from the application.

In a variation on this embodiment, receiving the scene graph for the application involves receiving multiple scene graphs for multiple applications, and displaying the visual output involves displaying visual output for multiple applications in the same display.

In a further variation, displaying the visual output involves ensuring that there is no interference between visual output from different user interfaces.

In a further variation, the user interface manager maintains the multiple scene graphs in separate data structures.

In a further variation, the user interface manager combines the multiple scene graphs into a single master scene graph that represents an entire scene to be displayed.

In a variation on this embodiment, the system intercepts a user input event for the user interface at the user interface manager before the user input event is forwarded to the application. The system then performs an associated action.

In a further variation, after intercepting the user input event, the user interface manager can: consume the user input event; forward the user input event to the application; or can modify the user input event before forwarding the user input event to the application.

In a further variation, performing the associated action involves modifying the scene graph to produce visual effects for the user interface.

In a variation on this embodiment, modifying the scene graph through the user interface manager involves: cutting or copying a portion of a first scene graph associated with a first application; and then pasting the portion to a second scene graph associated with a second application.

In a variation on this embodiment, modifying the scene graph through the user interface manager involves: cutting or copying a portion of the scene graph; and then converting the portion into an independent branch graph that the user interface manager interacts with directly.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs.)

3D Display Model

Figure 1A:
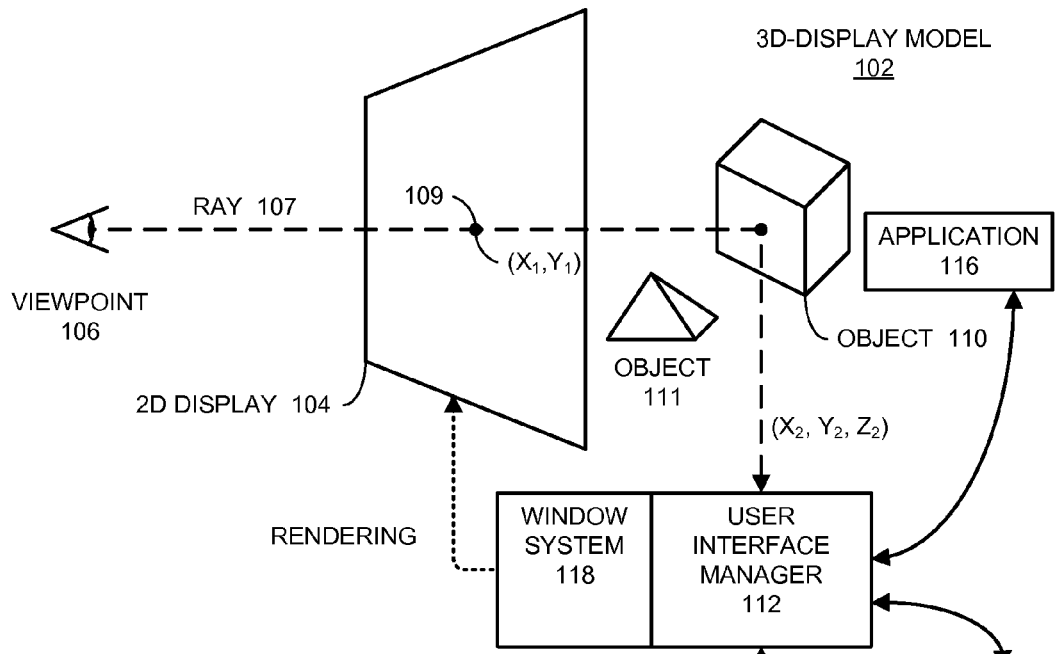
FIG. 1A illustrates a 3D display model in accordance with an embodiment of the present invention.
Figure 1B:
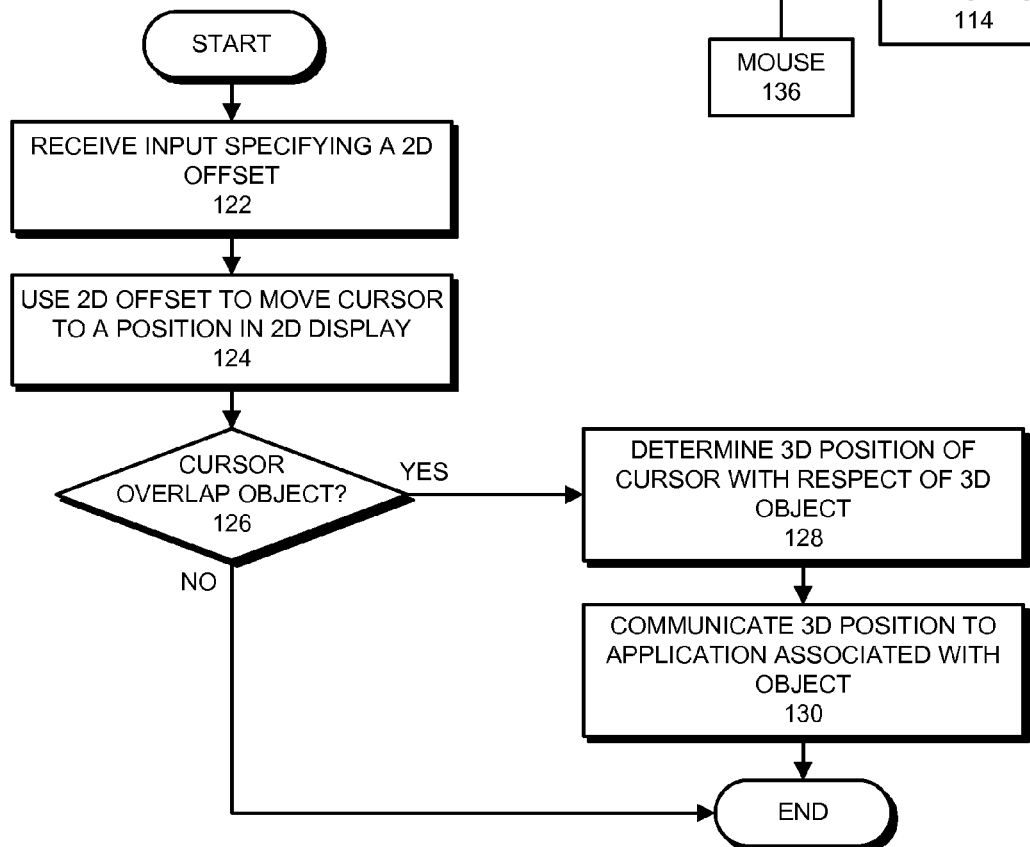
FIG. 1B presents a flow chart illustrating how input from a pointing device is communicated to an application associated with a window in a 3D display model in accordance with an embodiment of the present invention.

FIG. 1 illustrates a 3D display model 102 in accordance with an embodiment of the present invention. 3D display model 102 includes a number of 3D objects, including 3D object 110 and 3D object 111. 3D display model 102 can additionally include a background (which is not shown).

3D objects 110-111 can be associated with a number of object attributes. For example, 3D objects 110-111 can include x, y, and z position attributes that specify the 3D position of the centers of 3D objects 110-111 within 3D display model 102, as well as a rotation attributes that specify rotations of 3D objects 110-111 around horizontal and vertical axes. 3D objects 110-111 can also be associated with scaling factor, translucency and shape attributes.

3D objects 110-111 within 3D display model 102 are viewed from a viewpoint 106 through a 2D display 104, which is represented by a 2D rectangle within 3D display model 102. During the rendering process, downstream system components perform various well-known rendering techniques, such as ray tracing, to map objects from 3D display model 102 into corresponding locations in 2D display 104.

Note that user inputs, for example received through a mouse a keyboard, can be used to manipulate windows within 3D display model 102. More specifically, user interface manager 112 can receive input from a 2D pointing device, such as mouse 136, and can communicate this input to applications 114 and 116. In doing so, user interface manager 112 first receives an input specifying a 2D offset from mouse 136 (see step 122 in FIG. 1B). Next, the user interface manager 112 uses this 2D offset to move a cursor 109 to a new position $(x_1, y_1)$ in 2D display 104 (step 124).

The system then determines if cursor 109 overlaps an object in 3D display model 102 (step 126). This can be accomplished by projecting a ray 107 from viewpoint 106 through cursor 109, and then determining if the ray intersects a window. If there is no overlap, the process is complete.

Otherwise, if there is overlap, the system uses the 3D position $(x_2, y_2, z_2)$ within display model 102 where ray 107 intersects object 110, as well as attributes of object 110, such as position and rotation attributes, to determine the position $(x_3, y_3, z_3)$ of this intersection with respect to a 3D coordinate system of object 110 (step 128). The system then communicates this 3D position $(x_3, y_3, z_3)$ to application 116, which is associated with object 110 (step 130).

User Interface Manager

Figure 2:
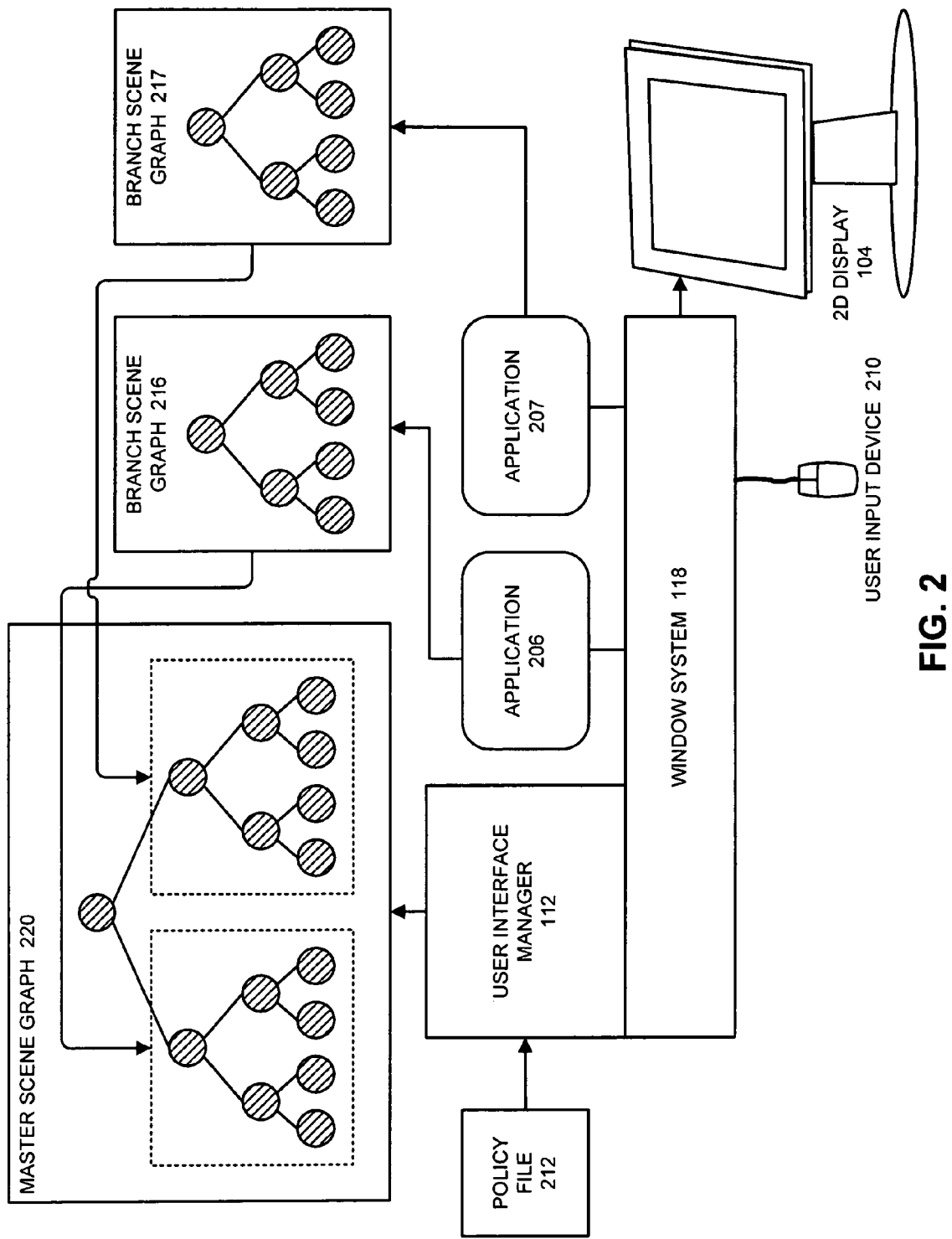
FIG. 2 illustrates how the user interface manager interacts with scene graphs for various applications in accordance with an embodiment of the present invention.

FIG. 2 illustrates how user interface manager 112 interacts with scene graphs for various applications in accordance with an embodiment of the present invention. As is illustrated in FIG. 2, window system 118 (which is typically a portion of an associated operating system) receives input from one or more user input devices, such as user input device 210, and causes visual output to be sent to 2D display 104. Window system 118 also coordinates interactions between client applications 206-207, user input device 210 and 2D display 104.

In one embodiment of the present invention, user interface manager 112 is a special type of window system client that has a special privilege to receive user-interface-related information from window system 118. As is illustrated in FIG. 2, user interface manager 112 maintains a master scene graph 220 that represents an entire scene for 2D display 104.

This master scene graph 220 includes "branch graphs" (also referred to as "subgraphs"), which are generated by client applications 206-207. More specifically, client applications 206-207 generate corresponding branch graphs 216-217, which for example can represent user interfaces for client applications 206-207. User interface manager 112 then incorporates these branch graphs 216-217 into a master scene graph 220. Note that the process of incorporating branch graphs 216-217 into master scene graph 220 can involve manipulating spatial locations and orientations of components within branch graphs 216-217, as well as performing other operations on branch graphs 216-217. In an alternative embodiment of the present invention, user interface manager 112 maintains branch graphs 216-217 in separate data structures, and does not combine them into a single master scene graph 220.

During subsequent system operation, user interfaces manager 112 can perform other operations on branch graphs 216-217 in accordance with policies defined in associated policy file 212. These operations are described in more detail below with referent to FIG. 4.

Exemplary Scene Graph

Figure 3A:
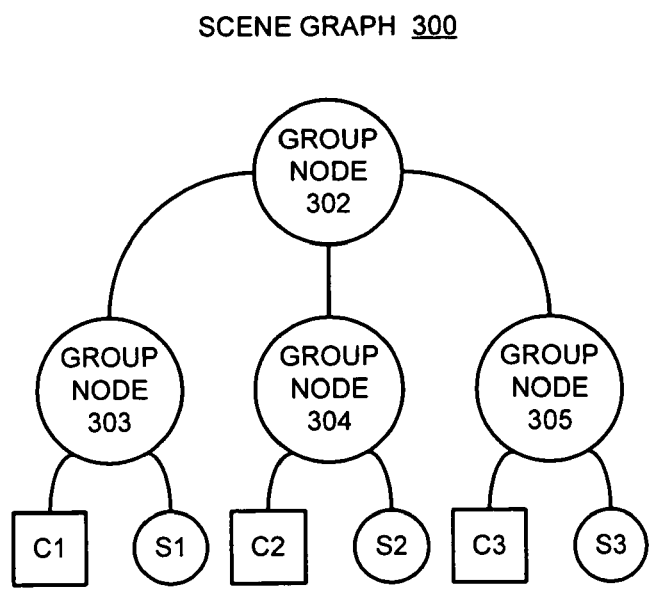
FIG. 3A illustrates an exemplary scene graph in accordance with an embodiment of the present invention.

FIG. 3A illustrates an exemplary scene graph 300 in accordance with an embodiment of the present invention. Scene graph 300 includes a number of leaf nodes that represent cubes C1-C3, and a number of leaf nodes that represent spheres S1-S3.

Figure 3B:
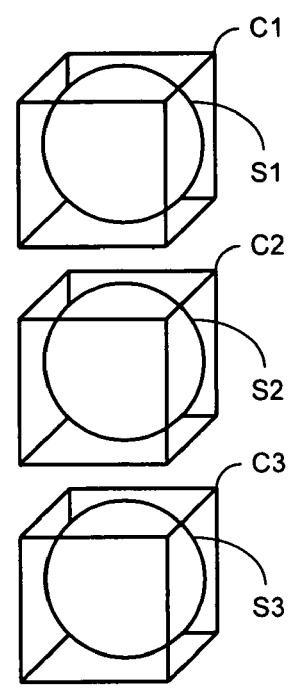
FIG. 3B illustrates a corresponding 3D output generated from the scene graph in accordance with an embodiment of the present invention.

Group nodes 302-305 collectively combine these loaf nodes into a single larger group. More specifically, group node 303 combines leaf nodes C1 and S1 into a first subgroup that represents a sphere within a cube as is illustrated in FIG. 3B. Similarly, group node 304 combines leaf nodes C2 and S2 into a second subgroup that represents a sphere within a cube, and group node 305 combines leaf nodes C3 and S3 into a third subgroup that represents a sphere within a cube. A higher-level group node 302 combines the subgroups for group nodes 303-305 into a single larger group that includes a stack of three spheres within cubes as is illustrated in FIG. 3B.

Note that a scene graph typically defines properties for these graphical components, including color, transparency, location, and transformations such as rotation and scaling. These properties can either be expressed as a special kind of node, or alternatively, can be embedded in a node representing a graphical component. Also note that a scene graph can also include transformation nodes (not shown) which can define transformations for associated subgraphs.

Process of Manipulating Scene Graph

Figure 4:
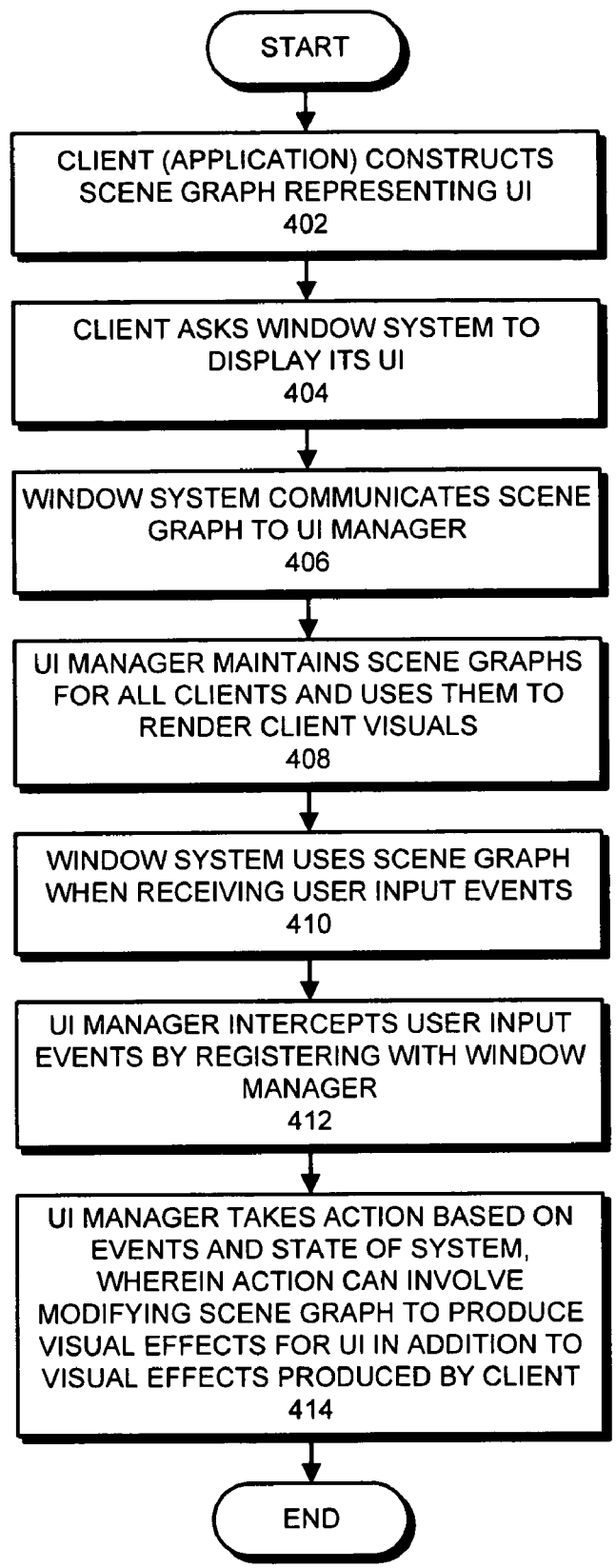
FIG. 4 presents a flow chart illustrating how the user interface manager manipulates a scene graph in accordance with an embodiment of the present invention.

FIG. 4 presents a flow chart illustrating how user interface manager 112 manipulates a scene graph in accordance with an embodiment of the present invention. First, the client (application) generates a scene graph that represents its user interface (UI) (step 402). This can be done in a programmatic manner as in Java3D, or in a manner based on a declarative expression by, for example, digesting a UI representation specified in VRML.

Next, the client asks window system 118 to display the client's UI by communicating the newly generated scene graph to window system 118 (step 404). Window system 118 subsequently communicates the scene graph to user interface manager 112 (step 406). In one embodiment of the present invention, user interface manager 112 is a special type of window system client that has a special privilege to receive and manipulate information related to graphical objects from window system 118. (For example, this type of architecture can be found in X Window System.)

User interface manager 112 maintains all of the client scene graphs and uses them in rendering client visuals (step 408). This can be done in two ways. (1) User interface manager 112 can maintain the client scene graphs as separate data structures. (2) Or, user interface manager 112 or window system 118 can maintain a single master scene graph 220 that represents the entire scene to be displayed and can incorporate client scene graphs into the master scene graph as branch graphs.

Next, window system 118 uses the scene graph to receive user input events (step 410). In one embodiment of the present invention, a user input event is recognized on a scene graph node basis. An application can express interest in receiving events by registering to receive specific kinds of events of interest and/or events associated with specific nodes of interest. Window system 118 can then deliver the specified events to the application based on this registration information.

In one embodiment, window system 118 (more precisely the code that hosts scene graph) can perform picking to identify a target node for an event. Next, the event is sent to the client as a special pick event with an identifier for the hit object included. On the client side, this message can be digested and the corresponding event can be delivered to the target object.

In one embodiment of the present invention, user interface manager 112 can intercept the above-described events by similarly registering with window system 118 (step 412). Note that unlike in existing systems, this enables user interface manager 112 to intercept events associated with nodes defined by client applications. Note that window system 118 routes such events to user interface manager 112 first. Next, in response to an event, user interface manager 112 can perform an associated action. In addition to performing the associated action, user interface manager 112 can consume the user input event; can forward the user input event to the application; or can modify the user input event before forwarding the user input event to the application.

Note that while intercepting the event, user interface manager 112 can obtain information that specifies which node in a scene graph defined by an application is related to the event. This enables user interface manager 112 to perform some action against a node defined by the application.

Next, based on the events and the system state, user interface manager 112 takes some action (step 414). This can involve modifying a property of a client's scene graph to achieve visual effect for the user. For example, user interface manager 112 can enlarge a portion of a client visual when the portion (node) receives mouse focus. It can also change the translucency of (a part of) a client visual based on user input and interaction activities. It can also shake the entire client visual when the client starts consuming too many computational resources.

If user interface manager 112 receives a request from the user to move the position of a client visual within 3D display environment 102, user interface manager 112 can check the bounding shape (box) of the client visual, and can move client visual, if necessary, so that it doesn't collide with visual for other clients. User interface manager 112 can also move each part (node) of a client visual to illustrate a momentum effect (e.g., a part of client visual that is attached to a client body with a small surface can be illustrated as moving with a momentum-related delay by altering coordinate properties of the part accordingly). User interface manager 112 can also ad blur effects to a graphical object based on the speed of the graphical object.

User interface manager 112 can also be used to "cut-and-paste" or "drag-and-drop" portions of a scene graph. More specifically, user interface manager 112 can cut or copy a portion of a first scene graph associated with a first application, and then paste the portion to a second scene graph associated with a second application. This technique can, for example, be used to drag a book (a branch graph) from a bookshelf (3D user interface for a file manager application) and drop it to another bookshelf located farther from the user. Or, it can drop it on a desk located closer to the user.

Alternatively, user interface manager 112 can convert the portion of the first scene graph into an independent branch graph that the user interface manager interacts 112 with directly.

Conversely, user interface manager 112 can incorporate an independent branch graph associated with a lower-level application into a higher-level scene graph associated with a higher-level application. In doing so, the independent branch graph can become a lower-level branch graph within the higher-level scene graph.

This operation is relatively straightforward if the lower-level application and the higher-level application are the same application. However, if they are different applications, security issues can arise. For example, the lower-level application may not want to allow the higher-level application to look into the lower-level branch graph.

For security purposes, in one embodiment of the present invention the lower-level branch graph is attached to the higher-level scene graph through a special "attaching point" node. This attaching point node performs a security check to ensure that only a privileged system program (such as user interface manager 112 or other system component) can view and operate on the lower-level scene graph.

In one embodiment of the present invention, this security mechanism is used to ensure that the higher-level application cannot access lower-level branch graph directly. However, the higher-level application can obtain basic information, such as the volume occupied by the lower-level branch graph. In another embodiment of the present invention, the higher-level application is able to access the lower-level branch graph.

Note that incorporating the lower-level branch graph into the higher-level scene graph provides a number of advantages. For example, it allows rendering operations involving both the lower-level branch graph and the higher-level scene graph to take place in same context.

Furthermore, note that the lower-level application can also potentially access the higher-level scene graph. In this case, we can provide a similar security mechanism to restrict the lower-level application from accessing portions of the higher-level scene graph.

Note that by using user interface manager 112 in the above-described manner, we can drag-and-drop fairly complicated visuals of an application, because user interface manager 112 is aware of the scene graph and can directly manipulate a branch graph to perform drag-and-drop (and cut-and-paste) operations.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enabling a user interface manager to modify a scene graph for an application, comprising:
   receiving the scene graph for the application, wherein the scene graph defines visual attributes for a user interface associated with application;
   using the scene graph to render a visual output for the user interface;
   displaying the visual output for the user interface to a user of the application; and
   modifying the scene graph through the user interface manager, whereby the user interface manager can produce visual effects for the user interface in addition to visual effects produced by the application;
   wherein modifying the scene graph through the user interface manager involves adding a lower-level branch graph to the scene graph to produce a unified scene graph;
   wherein the lower-level branch graph is associated with a second application; and
   wherein adding the lower-level branch graph to the scene graph additionally involves providing a security mechanism which can be used to restrict the application from accessing the lower-level branch graph associated with the second application.

2. The method of claim 1, wherein receiving the scene graph for the application involves:
   allowing the application to construct the scene graph; and
   receiving the scene graph from the application.

3. The method of claim 1,
   wherein receiving the scene graph for the application involves receiving multiple scene graphs for multiple applications; and
   wherein displaying the visual output involves displaying visual output for multiple applications in the same display.

4. The method of claim 3, wherein displaying the visual output involves ensuring that there is no interference between visual output from different user interfaces.

5. The method of claim 3, wherein the user interface manager maintains the multiple scene graphs in separate data structures.

6. The method of claim 3, wherein the user interface manager combines the multiple scene graphs into a single master scene graph that represents an entire scene to be displayed.

7. The method of claim 1, further comprising:
   intercepting a user input event for the user interface at the user interface manager before the user input event is forwarded to the application; and
   performing an associated action.

8. The method of claim 7, wherein after intercepting the user input event, the user interface manager:
   consumes the user input event;
   forwards the user input event to the application; or
   modifies the user input event before forwarding the user input event to the application.

9. The method of claim 7, wherein performing the associated action involves modifying the scene graph to produce visual effects for the user interface.

10. The method of claim 1, wherein modifying the scene graph through the user interface manager involves:
    cutting or copying a portion of a first scene graph associated with a first application; and
    pasting the portion to a second scene graph associated with a second application.

11. The method of claim 1, wherein modifying the scene graph through the user interface manager involves:
    cutting or copying a portion of the scene graph; and
    converting the portion into an independent branch graph that the user interface manager interacts with directly.

12. The method of claim 1, wherein adding the lower-level branch graph to the scene graph additionally involves providing a security mechanism, which can be used to restrict the second application from accessing higher-level portions of the scene graph associated with the application.

13. A computer-readable storage medium storing instructions that when executed by a computer cause the computer to perform a method for enabling a user interface manager to modify a scene graph for an application, the method comprising:
    receiving the scene graph for the application, wherein the scene graph defines visual attributes for a user interface associated with application;
    using the scene graph to render a visual output for the user interface;

displaying the visual output for the user interface to a user of the application; and modifying the scene graph through the user interface manager, whereby the user interface manager can produce visual effects for the user interface in addition to visual effects produced by the application;

wherein modifying the scene graph through the user interface manager involves adding a lower-level branch graph to the scene graph to produce a unified scene graph;

wherein the lower-level branch graph is associated with a second application; and wherein adding the lower-level branch graph to the scene graph additionally involves providing a security mechanism, which can be used to restrict the application from accessing the lower-level branch graph associated with the second application.

14. The computer-readable storage medium of claim 13, wherein receiving the scene graph for the application involves:
   allowing the application to construct the scene graph; and
   receiving the scene graph from the application.

15. The computer-readable storage medium of claim 13,
   wherein receiving the scene graph for the application involves receiving multiple scene graphs for multiple applications; and
   wherein displaying the visual output involves displaying visual output for multiple applications in the same display.

16. The computer-readable storage medium of claim 15, wherein displaying the visual output involves ensuring that there is no interference between visual output from different user interfaces.

17. The computer-readable storage medium of claim 15, wherein the user interface manager maintains the multiple scene graphs in separate data structures.

18. The computer-readable storage medium of claim 15, wherein the user interface manager combines the multiple scene graphs into a single master scene graph that represents an entire scene to be displayed.

19. The computer-readable storage medium of claim 13, wherein the method further comprises:
   intercepting a user input event for the user interface at the user interface manager before the user input event is forwarded to the application; and
   performing an associated action.

20. The computer-readable storage medium of claim 19, wherein after intercepting the user input event, the user interface manager:
   consumes the user input event;
   forwards the user input event to the application; or
   modifies the user input event before forwarding the user input event to the application.

21. The computer-readable storage medium of claim 19, wherein performing the associated action involves modifying the scene graph to produce visual effects for the user interface.

22. The computer-readable storage medium of claim 13, wherein modifying the scene graph through the user interface manager involves:
   cutting or copying a portion of a first scene graph associated with a first application; and
   pasting the portion to a second scene graph associated with a second application.

23. The computer-readable storage medium of claim 13, wherein modifying the scene graph through the user interface manager involves:

cutting or copying a portion of the scene graph; and
converting the portion into an independent branch graph that the user interface manager interacts with directly.

24. The computer-readable storage medium of claim 13, wherein adding the lower-level branch graph to the scene graph additionally involves providing a security mechanism, which can be used to restrict the second application from accessing higher-level portions of the scene graph associated with the application.

25. An apparatus that enables a user interface manager to modify a scene graph for an application, comprising:
   a receiving mechanism configured to receive the scene graph for the application, wherein the scene graph defines visual attributes for a user interface associated with application;

a rendering mechanism configured to use the scene graph to render a visual output for the user interface;

a display mechanism configured to display the visual output for the user interface to a user of the application; and a user interface manager configured to modify the scene graph, whereby the user interface manager can produce visual effects for the user interface in addition to visual effects produced by the application;

wherein modifying the scene graph through the user interface manager involves adding a lower-level branch graph to the scene graph to produce a unified scene graph;

wherein the lower-level branch graph is associated with a second application; and wherein adding the lower-level branch graph to the scene graph additionally involves providing a security mechanism, which can be used to restrict the application from accessing the lower-level branch graph associated with the second application.

26. A means for enabling a user interface manager to modify a scene graph for an application, comprising:
   a receiving means for receiving the scene graph for the application, wherein the scene graph defines visual attributes for a user interface associated with application;
   a rendering means for using the scene graph to render a visual output for the user interface;
   a display means for displaying the visual output for the user interface to a user of the application; and
   a user interface management means configured to modify the scene graph, whereby the user interface management means can produce visual effects for the user interface in addition to visual effects produced by the application;
   wherein modifying the scene graph through the user interface manager involves adding a lower-level branch graph to the scene graph to produce a unified scene graph;
   wherein the lower-level branch graph is associated with a second application; and
   wherein adding the lower-level branch graph to the scene graph additionally involves providing a security mechanism, which can be used to restrict the application from accessing the lower-level branch graph associated with the second application.

* * * * *